Oct. 22, 1940.   E. L. JACK   2,218,534
CITRUS FRUIT GRATINGS AND METHOD OF PREPARING THE SAME
Filed April 23, 1938
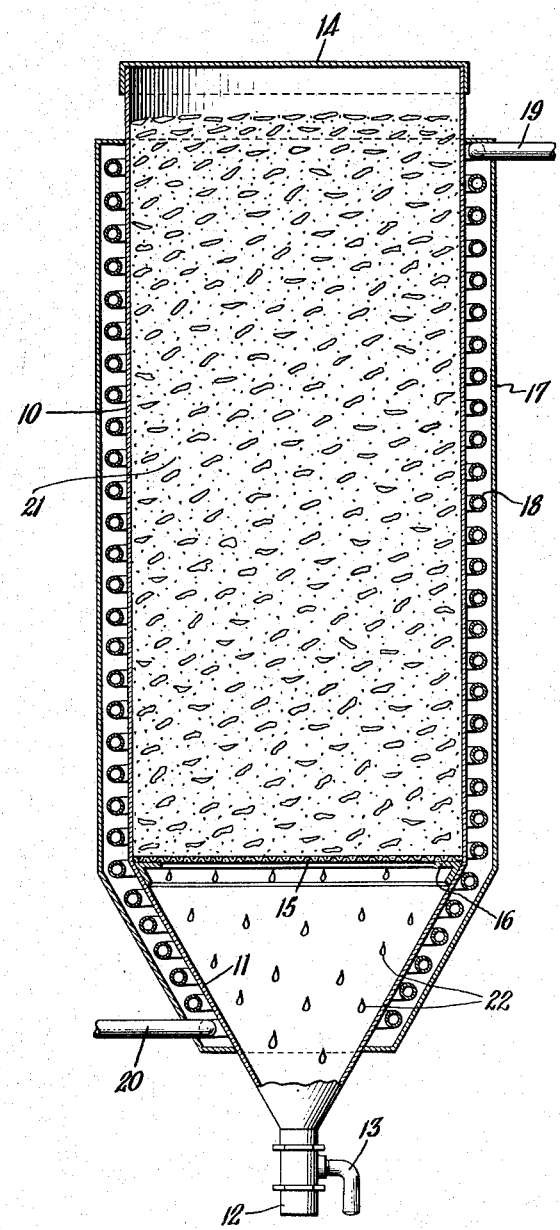
INVENTOR
*Eugene L. Jack.*
BY
ATTORNEY Patented Oct. 22, 1940

2,218,534

UNITED STATES PATENT OFFICE 2,218,534

CITRUS FRUIT GRATINGS AND METHOD OF PREPARING THE SAME

Eugene L. Jack, Davis, Calif., assignor to The Borden Company, New York, N. Y., a corporation of New Jersey Application April 23, 1938, Serial No. 203,807

7 Claims. (Cl. 99—102)

This invention relates to prepared citrus fruit peel gratings and the method of their preparation. It has been customary heretofore in preparing slices of candied citrus fruit peel to boil, subject to heating in the open air, or otherwise cook the peel of citrus fruit before a coating of sugar is applied thereto. This not only gives the candied fruit an unnatural flavor in the nature of a cooked taste but also drives off certain essential oils which are very volatile and which constitute an important element of the flavor of the natural peel.

My invention is concerned with the preparation of candied citrus fruit peel or gratings while preserving the natural flavor thereof to a high degree, and represents an improvement in the method of preparing citrus fruit gratings described in the application of Platt and Kratz, Serial No. 203,749, filed April 23, 1938.

One object of my invention is the provision of a process of preparing dried citrus fruit peel while preventing the loss of volatile flavoring constituents therefrom by use of a material which inhibits the volatilization thereof.

A further object is the provision of dried citrus fruit peel having good keeping qualities and containing more than 50% of the essential oils naturally present in said peel.

Another object of the invention is to dry citrus fruit peel gratings in a closed receptacle in the presence of an agent which becomes associated with the essential oil in such a manner as to inhibit volatilization thereof.

The invention will be best understood by a description of a specific example of my process which may be carried out using the apparatus shown in the drawing, although it will be apparent that many variations of this apparatus will be useful for carrying out my invention. The figure of the drawing shows a vertical sectional view taken through approximately the center of the receptacle for preparing candied citrus fruit gratings.

In the drawing, numeral 10 indicates a cylindrical receptacle provided with a funnel-shaped lower portion 11. At the bottom of the portion 10, an outlet pipe 12 is provided which is normally closed by a valve 13. At its top this receptacle 10 may be closed by a tight fitting cover 14. If desired, the cover 14 may be clamped in place or provided with a special seal to prevent escape of vapors from the receptacle. Near the upper part of the funnel-shaped portion 11 of the receptacle 10, a perforated false bottom, such as a woven wire screen 15 having openings about 1/16 inch in diameter may be provided supported by the flanged member 16 which rests on the inclined inner surface of the funnel-shaped portion 11. Surrounding substantially the entire receptacle is a jacket 17 enclosing a pipe coil 18. Steam, hot water or other heating medium, or a cooling medium may be introduced into the coil 18 through the inlet 19 and withdrawn through the outlet 20.

In the operation of my improved process, the citrus fruit is first suitably cleaned and gratings of the desired size are removed mechanically from the outside of the peel of the fruit. This may be accomplished by the use of any suitable well known grating device, care being taken to remove the flavedo of the fruit with as little of the albedo as feasible. The gratings are then mixed with a small proportion of a volatilization inhibiting substance which I believe coats any liberated droplets of the essential oils with an adsorbed membrane and thus shields them from direct contact with the atmosphere. Carbohydrate materials of an amorphous character, such as starch and dextrine, have this property of very substantially inhibiting the volatilization of these essential oils. Proteinaceous carbohydrate materials or farinaceous materials, such as wheat flour, have an even stronger action than the above mentioned carbohydrates. The volatilization inhibitor, or a mixture of two or more of such materials, is preferably selected so that it will not substantially alter the flavor of the gratings or affect the formation of syrup by the sugar which is added subsequently.

The proportion of carbohydrate or farinaceous material added to the gratings may vary within rather wide limits. Small amounts of this agent of the order of about 1% by weight based on the weight of the gratings are effective in improving the retention of volatile constituents by the gratings during dehydration. More than about 25% of the volatilization inhibitor, however, serves little useful purpose and may interfere with satisfactory water removal from the gratings. About 10% of this agent based on the weight of the fresh gratings has been found to be very satisfactory.

The sugar should be mixed with the gratings after the addition of the volatilization inhibitor thereto and about 1 to 3 parts of sugar may be employed for each part by weight of the mixture of gratings and inhibitor. For example, freshly grated lemon peel may be mixed with about 10% by weight, of wheat flour, and then thoroughly incorporated with about 2 parts, by weight, of powdered sucrose for each part of the flour-gratings mixture.

This mixture may then be placed in the receptacle 10 and heated to a temperature of about 175 to 195° F. with the cover 14 firmly secured in place until the syrup which drips through the foraminous member 15 has substantially ceased to flow. The mixture is then cooled in the closed receptacle, allowing the sugar to crystallize and form a protective coating about the gratings. Heating and cooling of the receptacle 10 may be easily accomplished by circulating a heating or cooling medium through the pipe coil 18 as required.

After the batch of gratings has been sufficiently cooled, it may be removed from the receptacle 10 and packaged directly, preferably in air-tight containers, or it may be further ground before being used.

The use of a volatilization inhibitor in accordance with my invention reduces the tendency of the essential oil in the peel gratings to volatilize even within the receptacle. It has been found that whereas citrus fruit gratings dried in the open air lose at least about 95% of the original essential oils, gratings dried according to my invention retain at least 50% of these essential oils originally in the peel. When about 10% of starch is employed, the oil loss may be reduced to about 30%, and when flour is employed the oil losses have been reduced to as little as 2% of the essential oils originally present in the peel.

By the term "peel" as used herein, I mean the outer covering of the fruit with or without part or all of the albedo.

Subject matter disclosed but not claimed in this application is claimed in the above-mentioned copending application of Platt and Kratz Ser. No. 203,749.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of drying citrus fruit peel comprising subdividing said peel, mixing a powdered solid amorphous carbohydrate as a volatilization inhibitor with said subdivided peel, thereafter mixing sugar with said peel, and warming said mixture in a closed receptacle while allowing syrup formed by said sugar to separate from the mixture.

2. The method as defined in claim 1 in which the mixture is cooled to crystallize sugar remaining with the peel after separation of syrup has substantially stopped and before the closed receptacle is opened.

3. A method of drying citrus fruit peel comprising subdividing said peel, mixing said peel with a farinaceous material, thereafter mixing sugar with said peel, and heating said mixture while allowing syrup formed by said sugar to drain away from the mixture.

4. A method of drying citrus fruit peel comprising subdividing said peel, mixing said peel with an amorphous carbohydrate, thereafter mixing sugar with said peel, and heating said mixture while allowing syrup formed by said sugar to drain away from the mixture.

5. A method of dehydrating citrus fruit peel to conserve the natural flavor, comprising grating the peel of a citrus fruit, incorporating with the gratings a small amount of an amorphous powdered carbohydrate material, mixing about 2 to 4 parts of sugar with 1 part of said peel and carbohydrate, and warming said mixture in a closed receptacle while allowing syrup formed by said sugar to drain away from the mixture.

6. The method defined in claim 5 in which the carbohydrate material comprises flour.

7. A method of dehydrating citrus fruit peel to conserve the natural flavor, comprising grating the peel of a citrus fruit, incorporating with the gratings about 10% of wheat flour, thereafter mixing about 2 to 4 parts of sugar with the gratings, warming the mixture in a closed receptacle to separate syrup formed by the sugar from the gratings, and cooling the gratings in the closed receptacle to crystallize the residual sugar on the surface of the gratings.

EUGENE L. JACK.